United States Patent [19]

Nunokawa

[11] Patent Number: 5,412,642
[45] Date of Patent: May 2, 1995

[54] METHOD OF ABSORBING DELAY FLUCTUATION IN CELL TRANSMISSION SYSTEM AND EXCHANGE UTILIZING THE METHOD

[75] Inventor: Masakatsu Nunokawa, Asaka, Japan

[73] Assignee: Kabushiki Kaisha Toshiba, Kawasaki, Japan

[21] Appl. No.: 94,229

[22] Filed: Jul. 21, 1993

[30] Foreign Application Priority Data

Jul. 22, 1992 [JP] Japan .................. 4-195558

[51] Int. Cl.⁶ .......................... H04J 3/14; H04L 12/56
[52] U.S. Cl. ..................... 370/17; 370/60.1; 370/94.2
[58] Field of Search .............. 370/13, 17, 60, 60.1, 370/61, 79, 82, 83, 84, 94.1, 94.2, 99, 108, 118; 375/122; 381/29, 30, 31; 341/51, 60, 67, 107

[56] References Cited

U.S. PATENT DOCUMENTS

| | | | |
|---|---|---|---|
| 5,148,429 | 9/1992 | Kudo et al. | 370/60 |
| 5,189,669 | 2/1993 | Nunokawa | 370/60 |
| 5,237,564 | 8/1993 | Lespagnol et al. | 370/60.1 |
| 5,241,535 | 8/1993 | Yoshikawa | 370/60 |
| 5,253,251 | 10/1993 | Aramaki | 370/60 |

Primary Examiner—Alpus Hsu
Attorney, Agent, or Firm—Finnegan, Henderson, Farabow, Garrett & Dunner

[57] ABSTRACT

A delay fluctuation absorbing method in which, at a cell receiver side, a fluctuation absorbing base time is calculated based on a decoding time of a heading cell among received cells, decoding time of cells stayed in a receive cell buffer for a predetermined monitoring time after receiving the heading cell is detected based on the number of such stayed cells, the fluctuation absorbing base time is corrected based on the decoding time of the stayed cells to determine a final fluctuation absorbing time.

20 Claims, 8 Drawing Sheets

METHOD OF ABSORBING DELAY FLUCTUATION IN CELL TRANSMISSION SYSTEM AND EXCHANGE UTILIZING THE METHOD

BACKGROUND OF THE INVENTION

1. Field of the Invention

The present invention relates to a delay fluctuation absorbing method of absorbing fluctuation of cell transmission delay which is generated at different levels for different cells depending on a traffic situation in the network of a cell transmission system when a cell containing encoded data arrives at a receiver side through the network, and an exchange which utilizes this method.

2. Description of the Related Art

In a cell transmission system, data to be transmitted is encoded and assembled into a cell, and the cell is transmitted to a receiver side through a network. In such a cell transmission system, in order to achieve a high decoding efficiency at the receiver side, so-called delay fluctuation absorbing control is performed to absorb the fluctuation of cell transmission delay so that each cell can make its reproduction timing at the receiver side.

As one of the systems to which the delay fluctuation absorbing control is applied, there is known a system which handles voice cells created by encoding voice signals at a variable rate.

FIGS. 7(a)–7(f) are timing charts illustrating an example of the time stamping operation during cell transmission in a cell transmission system in which the variable rate voice encoding is performed.

To describe the time stamping operation, the operation is divided into an operation at the sender side (FIG. 7(a) to (c)) and an operation at the receiver side (FIG. 7(d) to (f)).

In the operation at the sender side, a voice signal (FIG. 7(a)) is sampled and encoded to obtain coded data (FIG. 7(b)).

Then, cells are assembled for compressed data of PCM sampled data for the number of units (reference interval in FIG. 7(b)) which changes for each encoding rate (variable rate) while changing the encoding rate depending on the characteristics of voice data to obtain a transmission cell (FIG. 7(c)) of fixed length.

At this time, a control header is added to the cells for each cell unit as a control data for use in cell sequence control or discarded cell detection at the receiver side.

In this example, time stamp number (TS) in modulo 32 is added as the control header to maintain the reproduction timing.

In setting the time stamp number, the time stamp number at the time of starting the encoding operation is held and attached at the end of the encoding operation. By setting the time stamp number in this manner, decoding time can be secured at the time of decoding.

Further, a sequence number (SN) in modulo 8 is attached as a control header for detection of a discarded cell, and cell transmission is carried out each time the encoding operation is completed.

The time stamp number and sequence number in the control header are different in that the time stamp number is a non-consecutive number determined according to the encoding rate whereas the sequence number is a consecutive number.

On the receiver side, the cell transmitted from the sender side through the network is received with a delay (within-network delay ($d_{CIR}$)) (FIG. 7(d)).

To prevent the subsequent cells from being discarded due to delay fluctuation, i.e., delay varies for each cell, fluctuation absorbing time ($d_Y$) is provided. During the fluctuation absorbing time, received cells are stored in a buffer and, after passage of the delay fluctuation time $d_Y$ after the reception of the heading cell, a reproduction timing number is generated with the same period as in the time stamp number of the cell. The current reproduction timing number is compared with the time stamp number of the received cell. When coincidence is found between the time stamp number and the current timing number, the cell is reproduced (FIG. 7(e)).

Through the above reproducing operation, substantially the same reproduction voice waveform (FIG. 7(f)) as the voice waveform sent from the sender side can be obtained.

In such a conventional delay fluctuation absorbing method for the variable rate voice encoding, as the delay fluctuation absorbing time ($d_Y$), a constant time ($d_{X\%}$) which guarantees more than a cell discard allowance probability corresponding to an X % delay is previously allocated on an end-to-end basis at the time of path setting.

Figure 8:
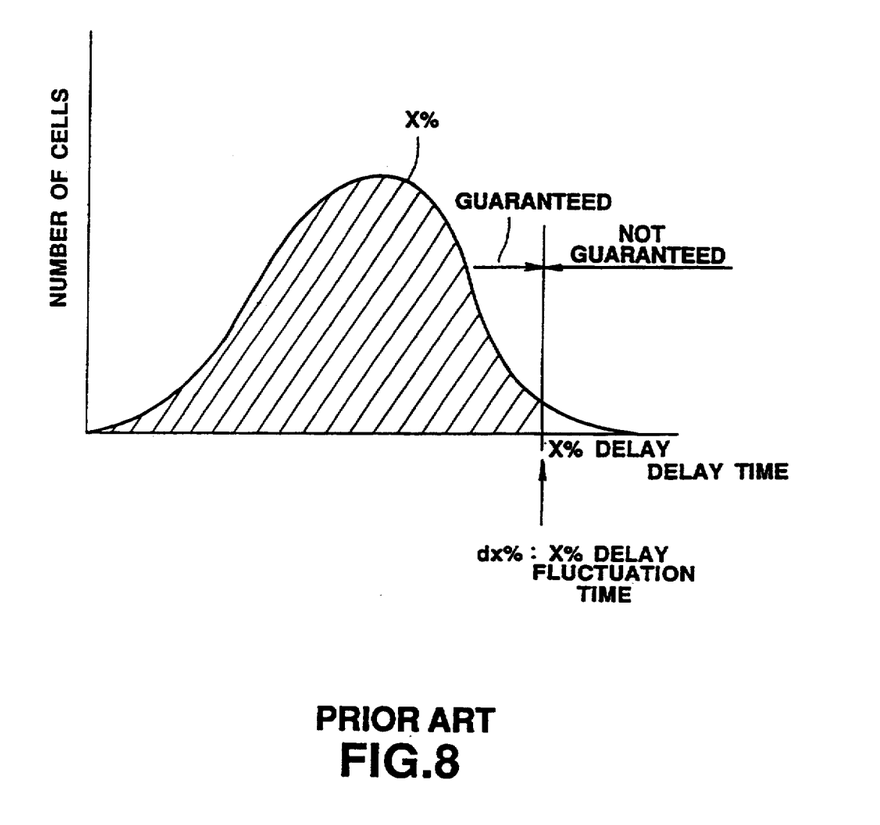
FIG. 8 is a graph showing a relationship between the number of received cells and delay fluctuation time for explaining a fluctuation time $d_X$ % for X % delay.

Generally, in this type of cell transmission system, relationship between the number of received cells and the delay fluctuation time is generally considered to have such a distribution as shown in FIG. 8.

In the cell distribution, a delay corresponding to a partition point of the X % cell region (shadowed area) is referred to as X % delay, and a fluctuation absorbing time capable of absorbing the X % delay to guarantee a maximum cell reception probability is referred to as the fluctuation absorbing time $d_{X\%}$ for the X % delay.

In actual operations for this type of cell transmission system, within-network delay fluctuates for each cell vary depending on current situations in the network.

Accordingly, the conventional control method for setting the fixed delay fluctuation absorbing time ($d_{X\%}$) has a problem that, when different cells provide different delays due to traffic situation or the like, the fluctuation absorbing time tend to be too large or too small, whereby the quality of voice to be reproduced varies.

In particular, in a system in which cell transmission is carried out based on the variable encoding rate, different cells provide different encoding rates, whereby the decoding time is not always the same for each cell. (The cell generation interval is not constant.)

That is, in such variable encoding rate-system, in addition to the problem of different within-network delays caused by different cells, there is another problem that encoding time differs for each cell.

As described above, in the case where different cells provide different encoding rates and thus provide different decoding times, when a fixed fluctuation absorbing time is set, there occurs such a problem that the fluctuation absorbing time becomes larger or smaller than a desired value, which results in that cell discard rate exceeds the X % delay allowance discard rate.

SUMMARY OF THE INVENTION

It is an object of the present invention to provide a delay fluctuation absorbing method capable of preventing a fluctuation absorbing time from being larger or smaller than an appropriate value caused by the fact that decoding rate varies for each cell due to the change in encoding rate, etc. to thereby perform more adaptive fluctuation absorbing control.

Another object of the present invention is to provide a delay fluctuation absorbing method capable of realizing more adaptive delay fluctuation absorbing control by taking the within-network delay of a heading cell into consideration to avoid such a situation that the within-network delay of a heading cell causes excessive storage of cells prior to reproduction whereby delay is increased by an amount corresponding to the time necessary for decoding of the stored cells thus causing insufficient fluctuation absorbing control.

A further object of the present invention is to provide an exchange capable of efficiently absorbing delay fluctuation to maintain a high decoding efficiency at a receiver side, even in different situations in which decoding time for the heading cell differs.

Still another object of the present invention is to provide an exchange capable of realizing more adaptive fluctuation absorbing control while efficiently absorbing the delay increased by decoding of cells stored in a buffer when a heading cell is received with a fluctuation delay larger than those of subsequent cells so that several of the subsequent cells are stored in a receive cell buffer before start of reproduction of the heading cell.

The above objects can be attained by a delay fluctuation absorbing method for use in a cell transmission system including a network through which data cells storing encoded voice data are transmitted with a delay, the delay varying for each of the data cell, comprising the steps of providing a delay fluctuation absorbing time after reception of a heading cell of the data cells until start of its reproducing operation, for absorbing the delay for each cell successively received so that the data cells are reproduced at their proper reproduction timing; detecting a decoding time of the received heading cell; and correcting the delay fluctuation absorbing time based on the decoding time of the heading cell.

According to another aspect of the present invention, a delay fluctuation absorbing method for use in a cell transmission system including a network through which data cells storing encoded voice data are transmitted with a delay, the delay varying for each of the data cell comprises the steps of providing a delay fluctuation absorbing time after reception of a heading cell of the data cells until start of its reproducing Operation, for absorbing the delay for each cell successively received so that the data cells are reproduced at their proper reproduction timing detecting a decoding time of the received heading cell; calculating a delay fluctuation absorbing base time on the basis of the delay fluctuation absorbing time and the decoding time of the heading cell; detecting the number of the received cells stored in a buffer provided at the receiver side for a predetermined time after the reception of the heading cell; obtaining a decoding time of the stored cells based on the number of the stored cells; and correcting the delay fluctuation absorbing base time on the basis of the decoding time of the stored cells.

According to still another aspect of the present invention, an exchange comprises cell processing/transmitting means for encoding voice data, converting the encoded data into cells, adding to each of the cells a control header including a sequence data, and transmitting the cells to a network; cell receiving/processing means having a buffer, for storing received cells in the buffer, reproducing the stored cells into coded data according to the sequence data of the cells, and decoding the coded data into the voice data; heading-cell decoding time detecting means for detecting a decoding time of a heading cell of the received cells; correcting means for correcting a predetermined delay fluctuation absorbing time based on the decoding time of the heading cell; and control means for controlling the cell receiving/processing to start reproducing of the heading cell and subsequent cells after elapse of the corrected fluctuation absorbing time after reception of the heading cell.

According to a further aspect of the present invention, an exchange comprises cell processing/transmitting means for encoding voice data, converting the encoded data into cells, adding to each of the cells a control header including a sequence data, and transmitting the cells to a network; cell receiving/processing means having a buffer, for storing received cells in the buffer, reproducing the stored cells into coded data according to the sequence data of the cells, and decoding the coded data into the voice data; heading-cell decoding time detecting means for detecting a decoding time of a heading cell of the received cells; delay fluctuation absorbing base time calculating means for calculating a delay fluctuation absorbing base time based on a predetermined delay fluctuation absorbing time and the decoding time of the heading cell; stored-cells decoding time detecting means for detecting the number of cells stored in the buffer for a predetermined time after receiving the heading cell so as to detect decoding time of the stored cells; correcting means for correcting the delay fluctuation absorbing base time based on the decoding time of the cells stored in the buffer; and control means for controlling the cell receiving/processing to start reproducing of the heading cell and subsequent cells after elapse of the corrected fluctuation absorbing time after receiving the heading cell.

In the delay fluctuation absorbing method of the present invention, a decoding time of a voice cell (heading cell) first arrived at the cell receiver side prior to start of its reproducing operation is detected, and the fluctuation absorbing delay time is controlled according to the heading-cell decoding time.

When this method is applied to a variable rate voice encoding system, the decoding time of the heading cell can be detected based on the encoding rate of the heading cell, and the fluctuation absorbing time can be variably set according to an equation having the encoding rate of the heading cell as a variable.

In a conventional method in which fluctuation absorbing time is a fixed value, the fluctuation absorbing time may be set to meet the worst condition in system conditions. However, according to the present invention, since more adaptive fluctuation absorbing control can be realized while adjusting the fluctuation absorbing time to have a suitable value based on the decoding time of the heading cell, such a demerit can be avoided.

According to the present invention, since it is not necessary to adjusting the fluctuation absorbing time at its worst condition, providing a excessively large absorbing time delay can be avoided.

Further, in another delay fluctuation absorbing method of the present invention, the fluctuation absorbing delay time is calculated by taking the decoding time of the heading cell into consideration, and the calculated value is suitably increased or decreased by taking the within-network delay fluctuation factor of the heading cell into account.

In this method, an equation for setting the fluctuation absorbing time comprises a function having the decoding time of the heading cell as its variable and a function having the decoding time of cells stored in the receive cell buffer for a predetermined time after reception of the heading cell as its variable.

In the delay fluctuation absorbing control, for example, based on a variable rate voice encoding system, according to the above equation, the decoding time of the heading cell is first detected based on the encoding rate of the heading cell to calculate the fluctuation absorbing base time reflecting the encoding rate.

Further, the cell store state of the cell buffer in the cell receiver side is monitored for a predetermined time after reception of the heading cell to detect the decoding time of the stored cells, and the fluctuation absorbing base time is corrected based on the stored-cells decoding time.

As described above, according to the present invention, the delay fluctuation absorbing time is set by taking not only the decoding time of the heading cell as a delay fluctuation factor but also the within-network delay of the received heading cell as another delay fluctuation factor into consideration. Therefore, even when the within-network delay of the heading cell might cause a plurality of cells to be stored in the cell buffer of the cell receiver side for the predetermined time after arrival of the heading cell, it is possible to minimize the increase in the delay time caused by the fact that the reproducing timing of the subsequent cells is delayed due to the reproduction of the stored cells. As a result, more adaptive fluctuation absorbing control can be realized.

BRIEF DESCRIPTION OF THE DRAWINGS

FIGS. 7(a), 7(b), 7(c), 7(d), 7(e), and 7(f) are timing charts for explaining a general example of time stamping operation based on a variable-rate voice encoding system.

DESCRIPTION OF THE PREFERRED EMBODIMENTS

An embodiment of the present invention will be described with reference to the attached drawings.

Figure 1:
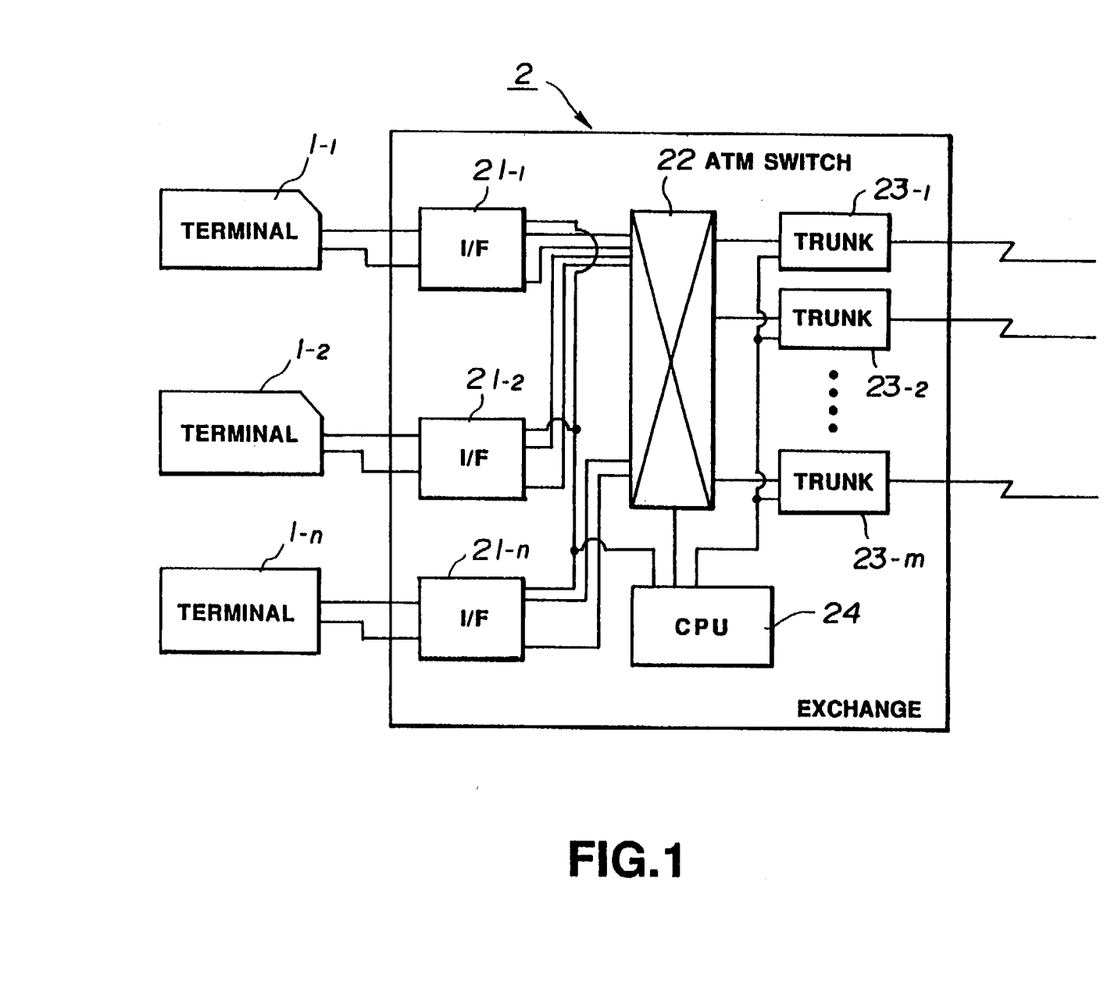
FIG. 1 is a block diagram of a cell transmission system to which a delay fluctuation absorbing method according to the present invention is applied.

Referring to FIG. 1 illustrating a block diagram of a major part of a cell transmission system to which a delay fluctuation absorbing method according to the present invention is applied, terminals $1_{-1}$ to $1_{-n}$ for handling voice data are connected to lines through an exchange 2.

The exchange 2 has terminal interface circuits $21_1$ to $21_n$ corresponding to the terminals $1_1$ to $1_{-n}$, an ATM switch 22, trunk circuits $23_{-1}$ to $23_{-m}$, and a central processing unit (CPU) 24 for controlling these circuits and the switch individually or in combination.

Figure 2:
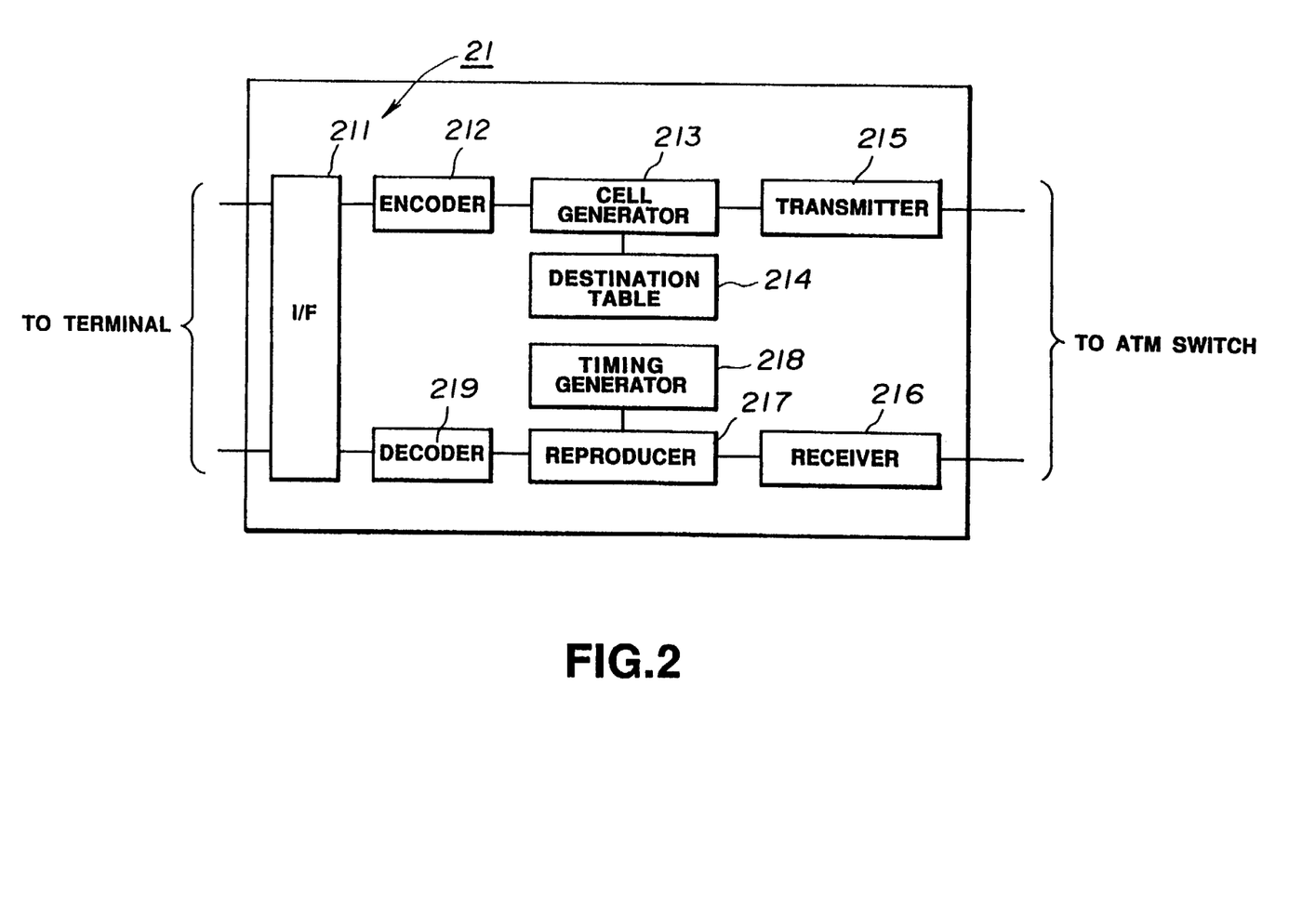
FIG. 2 is a block diagram of a terminal interface circuit in the system of FIG. 1.

FIG. 2 is a block diagram of one of the terminal interface circuits $21_1$ to $21_n$ in the exchange 2, each of which comprises an input/output interface 211 connected to one of the terminals $1_{-1}$ to $1_{-n}$ and two portions, i.e., sending portion (cell sender side) and receiving portion (cell receiver side).

The cell sender side includes an encoder 212, a cell generator 213, a cell destination table 214 and a cell transmitter 215, whereas the cell receiver side includes a cell receiver 216, a cell reproducer 217, a reproduction timing generator 218, and a decoder 219.

Communicating process in the system of the present invention will now be described focusing mainly on the terminal interface circuit $21_{-1}$, while considering the control for absorbing the delay fluctuation of a received cell to prevent reduction of a cell decoding rate.

In the cell sender side of the terminal interface circuit $21_{-1}$, a voice data received from the terminal $1_{-1}$ is sent through terminal transmission lines to the input/output interface 211 and then to the encoder 212 in a sampled form.

The encoder 212 compresses the voice data at an encoding rate which is determined according to the characteristics of the voice data and applies the compressed data to the cell generator 213.

The cell generator 213 stores the compressed voice data at a data section in a fixed-length data cell, attaches a time stamp number and a sequence number to the cell, and adds a destination data as an index for transmission to a party node in a header of the cell while making reference to the cell destination table 214.

A cell generated by the cell generator 213 is sent to the cell transmitter 215, which transmits the cell to an associated line through a line-side transmission line, the ATM switch 22 and the trunk circuit 23 (FIG. 1).

In the cell reception side of the terminal interface circuit $21_{-1}$, a cell received through the trunk circuit 23 and the ATM switch 22 is applied to the cell receiver 216 including a cell buffer through a line-side receive line. The cell receiver 216 is then send the received cell to the cell reproducer 217.

The cell reproducer 217 compares a reproduction timing number provided by the reproduction timing generator 218 with a sequence number stored in the control header of the received cell. When these numbers coincide with each other, the cell reproducer 217 outputs data within the received cell to the decoder 219 as a reproduced voice signal.

The decoder 219 decodes the reproduced voice signal received from the cell reproducer 217 and sends the decoded data to the input/output interface 211 and then to the terminal $1_{-1}$ through a terminal-side receive line.

In a series of cell reproducing operations in the cell reception side of the terminal interface circuit $21_{-1}$, a delay fluctuation absorbing control as will be described below is carried out.

In more detail, in a first delay fluctuation absorbing method based on the variable rate voice encoding system according to the present invention, the following equation (1) is used for setting a fluctuation absorbing time d$_Y$ allowing guarantee of an X % delay exceeding a cell discard allowance probability.

$$d_Y \geq S_{MAX} - S_{FIRST} + d_X \% \quad (11)$$

(where $S_{MAX} \geq s_{FIRST} \geq S_{MIN}$)
 $S_{MAX}$: Maximum encoding rate
 $S_{MIN}$: Minimum encoding rate
 $S_{FIRST}$: encoding rate of cell first arrived
 $d_X \%$: X % delay fluctuation time As seen from the equation (1), according to the first delay fluctuation absorbing method of the present invention, the encoding rate ($S_{FIRST}$) of the cell first arrived is used as a variable parameter. Thus, the fluctuation absorbing time when $S_{FIRST} = S_{MIN}$ is expressed as follows.

$$d_Y \geq S_{MAX} - S_{MIN} + d_X \%$$

The minimum fluctuation absorbing time when $S_{FIRST} = S_{MAX}$ is expressed as follows.

$$d_Y \geq d_X \%$$

Figure 3A:
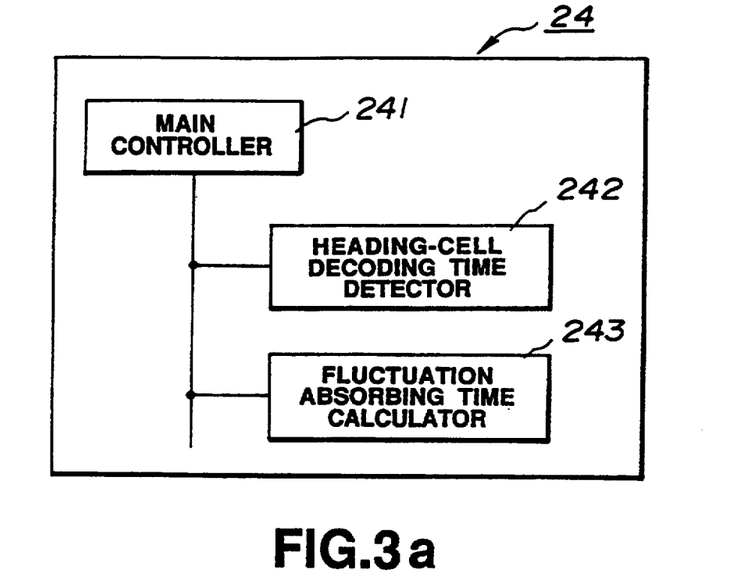
FIGS. 3a and 3b schematically illustrate different CPUs used in the system of FIG. 1.

In the above manner, the fluctuation absorbing time can be adaptively set depending on the encoding rate. The delay fluctuation absorbing control based on the encoding rate adaptive fluctuation absorbing method of the present invention can be implemented, for example, under control of the CPU 24. An example of the CPU 24 is shown in FIG. 3(a). In the CPU 24, a heading-cell decoding time detector 242 reads the encoding rate of the heading cell first stored in the buffer of the cell receiver 216 and detects the decoding time corresponding to the encoding rate.

A fluctuation absorbing time calculator 243, based on the heading-cell decoding time detected by the heading-cell decoding time detector 242 and the fluctuation absorbing time $d_X \%$ for the X % delay, calculates a fluctuation absorbing time reflecting the encoding rate of the heading cell according to the equation (1).

A main controller 241 performs individual control over the heading-cell decoding time detector 242 and the fluctuation absorbing time calculator 243. The main controller 241 also controls the operation of the cell reproducer 217 in such a manner, after reception of the heading cell, as to cause the reproducer 217 to start its cell reproducing operation from a time after passage of the fluctuation absorbing time reflecting the encoding rate of the heading cell.

Specific examples of the encoding rate adaptive fluctuation absorbing control of the present invention are shown in FIGS. 4(a)–4(d) and FIGS. 5(a)–5(d), when the first-arrived cell has the maximum encoding rate ($S_{MA}$) and when the first-arrived cell has the minimum encoding rate ($S_{MIN}$), respectively.

It is assumed in the examples of FIGS. 4(a)–4(d) and FIGS. 5(a)–5(d) that $S_{MAX} = 12$ units, $S_{MIN} = 4$ units and $d_X \% = 13$ units.

Further, in FIGS. 4(a)–4(d) and FIGS. 5(a)–5(d), similar to the cell flow of the time stamping operation of FIGS. 7(a)–7(f), only parts of the operation associated with the encoding, cell transmission, cell reception and decoding are illustrated. In these drawings, the time stamp number is denoted in modulo 16.

In the encoding rate adaptive fluctuation absorbing control of FIGS. 4(a)–4(d), when the system first receives a cell (which is referred to as "heading cell"), the decoding time of the heading cell (having a time stamp number "1") is read out in the cell receiver side, a fluctuation absorbing time exceeding $d_Y = d_X \%$ is set through the calculation of the equation (1), so that cells having delays less than the X % delay fluctuation time ($d_X \%$) can always make their reproduction timing.

In the drawing, a number in brackets indicates a wait unit number until a received voice cell is reproduced.

Similarly, in the encoding rate adaptive fluctuation absorbing control of FIGS. 5(a)–5(d), at the time when the system first receives a cell in the receiver side, a fluctuation absorbing time exceeding $d_Y = S_{MAX} - S_{MIN} + d_X \%$ is set through the calculation of the equation (1), so that cells having delays less than the X % delay fluctuation time ($d_X \%$) can always make their reproduction timing.

Accordingly, in the encoding rate adaptive fluctuation absorbing method of the present invention, the aforementioned equation (1) reflecting the encoding rate of the cell first received is used for setting the fluctuation absorbing time.

In this control, prior to the start of the reproducing operation, a fluctuation delay time ($d_Y$) of adaptively neither more nor less corresponding to the encoding rate (cell decoding time) of the voice cell first arrived at the cell receiver side can be provided to the cell receiver side, so that the necessity of fixedly setting the fluctuation absorbing time at its worst condition can be eliminated, delay increase can be prevented.

When a suitable fluctuation absorbing time and no cell missing can be achieved, always one or more received cells are present in the cell buffer of the receiver side at the reproduction timing of each received cell and thus reproduction can be carried out without any troubles.

When the heading cell is much larger in fluctuation width than subsequent cells for example, the subsequent cells successively arrive and some of the subsequent cells may sometimes be stored in the cell buffer of the receiver side within a time T (which is called cell stay monitoring time) from the time of the first-received cell.

When the start of reproducing operation of the received cell is allowed after passage of the fluctuation absorbing time set according to the equation (1), the reproducing operation must be started from the cells stored in the cell buffer of the receiver side, which requires an extra time for the reproduction of the stored cells.

As also seen from the equation (1), in the encoding rate adaptive fluctuation absorbing method of the present invention, when it is desired to set the fluctuation absorbing time, the value of encoding rate of the heading cell is reflected but no consideration is paid to the within-network delay time of the heading cell.

For this reason, when the heading cell arrives at the cell receiver side with a fluctuation delay width larger than subsequent cells, some of the subsequent cells are stored in the cell buffer of the receiver side prior to the start of its reproducing operation of the heading cell and thus a new delay caused by the reproduction of the stored cells is generated. As a result, even when the fluctuation absorbing time is adaptively controlled to have a suitable value according to the equation (1), the delay reducing effect may not be achieved as highly as expected from the viewpoint of the whole reproducing operation.

For the purpose of avoiding such a defect, according to a second delay fluctuation absorbing method of the present invention, a fluctuation absorbing time is set taking into consideration the encoding rate of the heading cell and also both the number of cells stored in the cell buffer of the cell receiver side for the cell store monitoring time T and the decoding time of the stored cells. That is, the delay fluctuation absorbing time is set according to the following equation (2) corresponding to the equation (1) for setting the above fluctuation absorbing time and added by a term f(a,b).

$$d_Y \geq S_{MAX} - S_{FIRST} + d_X \% + f(a,b) \qquad (2)$$

(where $S_{MAX} \geq S_{FIRST} \geq S_{MIN}$)

In the equation (2), the term f(a,b) is a correction function which has a number (a) of cells stored in the cell buffer for the above cell store monitoring time T and a decoding time (b) for the stored cell as variables.

Due to the correction function, when it is desired to set a fluctuation absorbing time first at the beginning of communication, the more suitable fluctuation absorbing time can be set at least in such a manner that the first arrived cell provides a maximum fluctuation width of within-network delay and subsequent cells provide smaller fluctuation widths.

The delay fluctuation absorbing control based on the adaptive fluctuation absorbing method of the present invention taking the within-network delay of the heading cell into account can be implemented, for example, by the CPU 24. An example of the CPU 24 is given in FIG. 3(b).

Figure 3B:
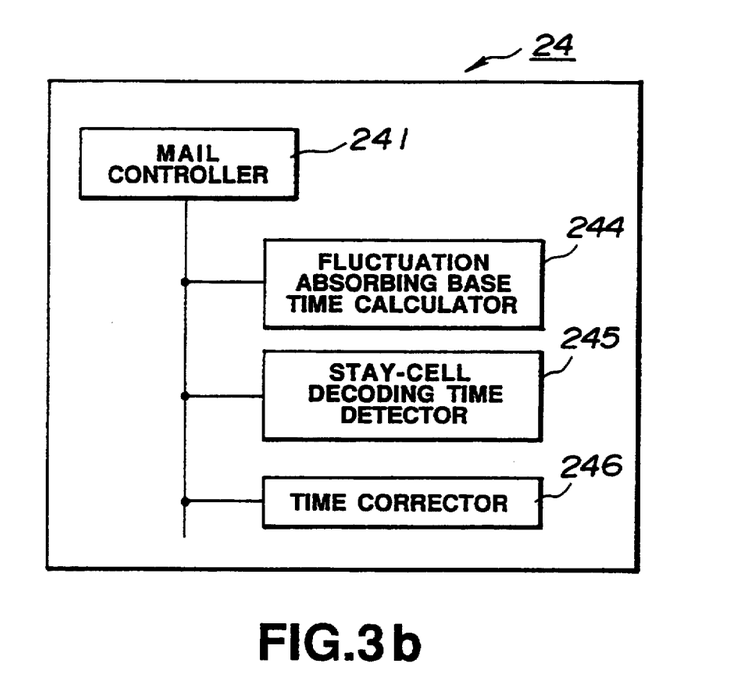
Figure 4:
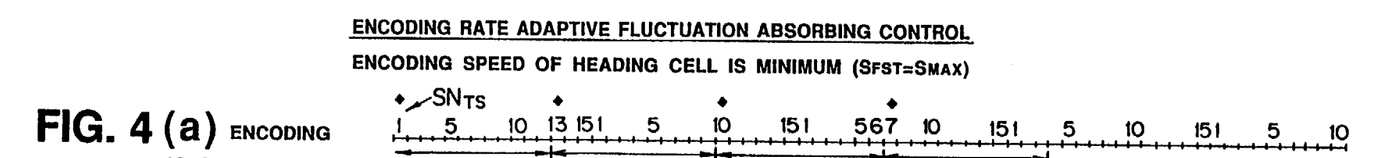
FIGS. 4(a), 4(b), 4(c), and 4(d) are timing charts for explaining an example of encoding rate adaptive fluctuation absorbing control according to the present invention when a heading cell has a minimum encoding rate.

With the illustrated structure of the CPU 24 of FIG. 3(b), a fluctuation absorbing base time calculator 244 reads out an encoding rate from a heading cell first stored in the buffer of the cell receiver 216, and calculates a fluctuation absorbing base time which corresponds to an addition of a time of several minute units corresponding to the encoding rate increased or decreased to the aforementioned X % delay fluctuation time $d_X \%$.

Further, a stored-cell decoding time detector 245 monitors the cells stored in the buffer of the cell receiver 216 for the above cell store monitoring time T and calculates decoding time for these stored cells.

A time corrector 246, based on the decoding time of all the stored-cell detected by the stayed-cell decoding time detector 245, corrects the fluctuation absorbing base time calculated by the fluctuation absorbing base time calculator 244 to obtain a new fluctuation absorbing base time.

The main controller 241 performs individual control over the fluctuation absorbing base time calculator 244, stayed-cell decoding time detector 245 and time corrector 246. The main controller 241 also controls the operation of the cell reproducer 217 to cause the cell reproducer 217 to start its reproducing operation from the moment when the above corrected fluctuation absorbing time elapses after reception of the heading cell.

The adaptive fluctuation absorbing control of the present invention taking the within-network delay of the heading cell into consideration will be detailed by referring to timing charts of FIGS. 6(a)–6(d) in connection with the operation when the control is applied to the cell transmission based on the variable rate voice encoding system.

Figure 6A:
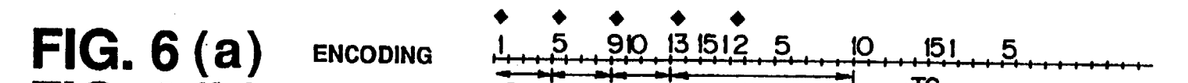
FIGS. 6(a), 6(b), 6(c), and 6(d) are timing charts for explaining an example of the adaptive fluctuation absorbing control of the invention when within-network delay of the heading cell is taken into consideration.
Figure 6B:
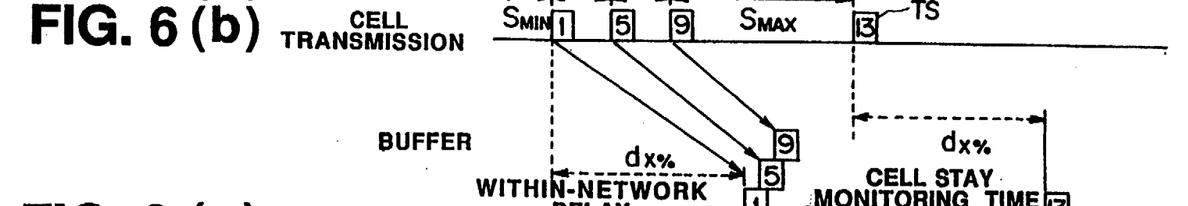

First, in a cell sender side, voice data to be transmitted are encoded based on the variable rate voice encoding system (FIG. 6(a)), subjected to a fixed-length data cell conversion at rates different depending on the characteristics of the voice data to obtain cells, and the cells are then sequentially transmitted (FIG. 6(b)).

Figures 6C, 6D:
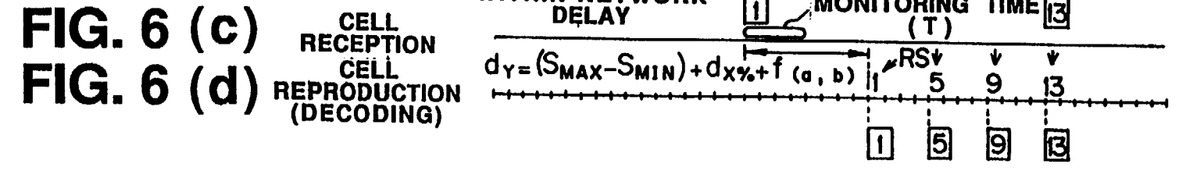

The encoding and cell transmitting operations of the cell sender side are exactly the same as the cell transmitting operations (FIGS. 6(b) and 6(c)) of FIG. 7.

The cells transmitted to the network through the above processing are subjected to finite an within-network delay ($d_{CIR}$) and then received in the cell receiver side.

The cell receiver side, when receiving heading one of the cells of the voice data from the network (FIG. 6(c)), first sets a fluctuation absorbing base time [($S_{MAX} - S_{MIN}$)+$d_X \%$] which takes into consideration both the previously-prescribed X % delay fluctuation time ($d_X \%$) and the encoding rate ($S_{FIRST}$) of the heading cell first arrived in order to prevent the discard of the subsequent cells having different fluctuation delays.

Thereafter, in the cell receiver side, buffering of the received cells is carried out for the time T set for the cell store monitoring. When no store cells are detected, reproduction of the received cell subjected to the buffering is started from the moment of passage of the set fluctuation absorbing base time, as explained above (FIG. 6(d)).

During the reproducing operation of the received cell, a reproduction time stamp number (RS) is generated at the same period (t) as the time stamp number (TS) of modulo 32 so that, when the both time stamp numbers are coincided with each other, the associated cell is reproduced (decoded).

At this time, in the cell receiver side, like a cell having a time stamp number "19", a cell which arrived as delayed after the generation time of a reproduction time stamp number "19" is handled as a missing cell in the decoding operation (refer to FIG. 7(e)).

Similarly, even when cell discard takes place in the network, the cell is handled as a missing cell in the decoding operation of the cell receiver side.

During the aforementioned cell receiving operation of the cell receiver side, in the example of FIGS. 6(a)–6(d), cells having time stamp numbers (TS) "1", "5" and "9" are stored in the cell buffer of the receiver side under the influence of the within-network delay of a maximum fluctuation delay in the cell store monitoring time T after arrival of the heading cell at the receiver side.

In such reception circumstances, according to the above first method for setting the fluctuation absorbing time according to the equation (1) not containing the correction function f (a,b), since reproducing operation is carried out while a plurality of cells are always stored in the cell buffer of the receiver side, the amount of delay tends to be increased.

With regard to this, according to the adaptive fluctuation absorbing method of the present invention taking the within-network delay of the heading cell into account, a value calculated according to the equation (1) is used as a fluctuation absorbing base time and the reference time is corrected according to the correction function f (a,b) having the stored cell number and the decoding time of the stored cell as variables, which results in that a suitable fluctuation absorbing time can be set.

Figure 5A:
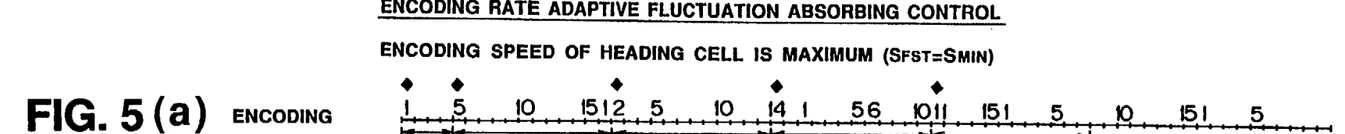
FIGS. 5(a), 5(b), 5(c), and 5(d) are timing charts for explaining an example of the encoding rate adaptive fluctuation absorbing control according to the present invention when the heading cell has a maximum encoding rate.
Figure 5B:
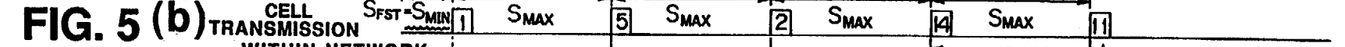
Figure 5C:
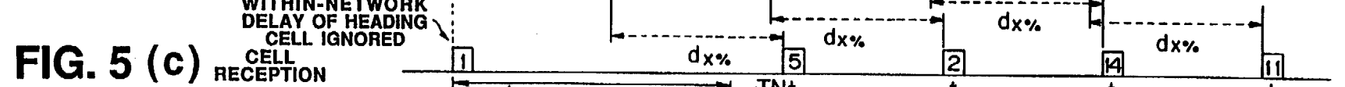
Figure 5D:
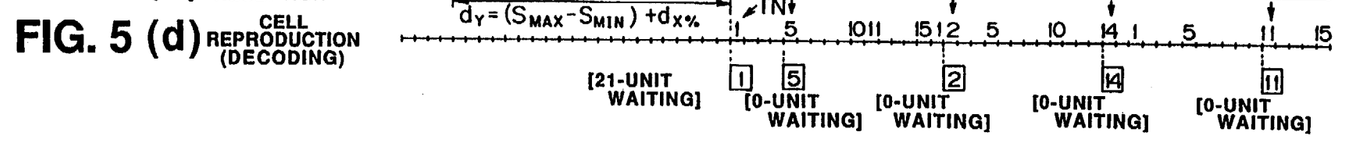

For example, in the example of FIGS. 6(a)–6(d), since storage of 3 cells is detected in the cell stay monitoring time T, the fluctuation absorbing time $d_Y$ is controlled according to the correction function f (a,b) reflecting the above condition to be shorter than the fluctuation absorbing base time (refer to FIG. 5(d)) calculated according to the equation (1).

In the encoding rate adaptive fluctuation absorbing method, a fluctuation absorbing time indicative of "21 units waiting" is set when the heading cell having a maximum encoding rate is received as shown in FIG. 5(d); whereas, in the adaptive fluctuation absorbing method of the present invention taking the within-network delay of the heading cell into consideration, the fluctuation absorbing time $d_T$ indicative of "8 units waiting" is set through the correction based on the recognition of 3 stored cells in the cell store monitoring time T after reception of the heading cell having a maximum encoding rate as shown in FIG. 6(d).

As a result, thereafter, even when a cell (having a TS of "13" in the example of FIG. 1) having, e.g., a minimum encoding rate or maximum encoding rate ($S_{MAX}$) is arrived with a maximum fluctuation width, its arrival timing can be made to coincide with the original reproduction timing and its reproducing operation can be handled with "0 units waiting".

Accordingly, according to the adaptive fluctuation absorbing method of the present invention taking the within-network delay of the heading cell into account, even when the within-network delay causes the fluctuation width of the heading cell to be larger than the fluctuation widths of the subsequent cells (when the delay causes the cell to be nearly stored in the receiver side), it can be avoided that cells are excessively stored in the cell buffer of the receiver side and thus increase in the delay of the reproducing operation can be minimized.

Although explanation has been made as to only the delay fluctuation absorbing control of cell transmission processed according to the variable rate encoding system in the foregoing embodiment, the delay fluctuation absorbing control of the present invention can exhibit substantially the same effects even when the control is applied to cell transmission based on a fixed-rate encoding system.

In the cell transmission based on the fixed-rate encoding system, cell encoding rate as a parameter determining the delay fluctuation does not contribute to it. Thus, in the delay fluctuation absorbing control of the cell transmission, an equation (not taking the encoding rate into consideration) different from the equation (1) is used for setting the fluctuation absorbing base time.

Therefore, when it is desired to apply the present invention to the cell transmission of the fixed-rate encoding system, such an equation can be used that corresponds to the equation for setting the fluctuation absorbing base time and added by the functional equation f (a,b) the number of cells stored in the cell buffer of the receiver side and a stored-cell decoding time as variables.

What is claimed is:

1. A delay fluctuation absorbing method for use in a cell transmission system including a network through which data cells storing encoded voice data are transmitted with a delay, the delay varying for each of the data cells,
wherein a delay fluctuation absorbing time is provided after reception of a heading cell of the data cells until start of its reproducing operation, for absorbing the delay for each cell successively received so that the data cells are reproduced at their proper reproduction timing, the method comprising the steps of:

preparing a predetermined delay fluctuation absorbing time; detecting a decoding time of the received heading cell; and
calculating a delay fluctuation absorbing time based on the decoding time of the heading cell and the predetermined delay fluctuation absorbing time.

2. A delay fluctuation absorbing method as set forth in claim 1, wherein the predetermined delay fluctuation absorbing time is an X % delay fluctuation absorbing time which assures a cell reception probability of X %.

3. A delay fluctuation absorbing method as set forth in claim 1 or 2, wherein each of the data cells is a fixed-length data packet in which voice data encoded at a variable encoding rate is stored.

4. A delay fluctuation absorbing method as set forth in claim 3, wherein the decoding time of the heading cell is detected based on an encoding rate of the heading cell.

5. A delay fluctuation absorbing method as set forth in claim 1 or 2, wherein each of the data cells is a variable-length data packet in which voice data encoded at a fixed encoding rate is stored.

6. A delay fluctuation absorbing method for use in a cell transmission system including a network through which data cells storing encoded voice data are transmitted with a delay, the delay varying for each of the data cells, comprising the steps of:
providing a delay fluctuation absorbing time after reception of a heading cell of the data cells until start of its reproducing operation, for absorbing the delay for each cell successively received so that the data cells are reproduced at their proper reproduction timing;
detecting a decoding time of the received heading cell;
calculating a delay fluctuation absorbing base time based on the delay fluctuation absorbing time and the decoding time of the heading cell;
detecting the number of the received cells stored in a buffer provided at the receiver side for a predetermined time after the reception of the heading cell;
obtaining a decoding time of the stored cells based on the number of the stored cells; and
correcting the delay fluctuation absorbing base time based on the decoding time of the stored cells.

7. A delay fluctuation absorbing method as set forth in claim 6, wherein the delay fluctuation absorbing time is an X % delay fluctuation absorbing time which assures a cell reception probability of X %.

8. A delay fluctuation absorbing method as set forth in claim 6 or 7, wherein each of the data cells is a fixed-length data packet in which voice data encoded at a variable encoding rate is stored.

9. A delay fluctuation absorbing method as set forth in claim 8, wherein the decoding time of the heading cell is detected based on an encoding rate of the heading cell.

10. A delay fluctuation absorbing method as set forth in claim 6 or 7, wherein each of the data cells is a variable-length data packet in which voice data encoded at a fixed encoding rate is stored.

11. An exchange comprising:
cell processing/transmitting means for encoding voice data, converting the encoded data into cells, adding to each of the cells a control header including a sequence data, and transmitting the cells to a network;

cell receiving/processing means having a buffer, for receiving and storing the transmitted cells in the buffer, reproducing the stored cells into coded data according to the sequence data of the cells and decoding the coded data into the voice data;

heading-cell decoding time detecting means for detecting a decoding time of a heading cell of the transmitted cells;

calculating means for calculating a delay fluctuation absorbing time based on the decoding time of the heading cell and a predetermined delay fluctuation absorbing time stored in the calculating means; and control means for controlling the cell receiving/processing means to start reproducing the heading cell and subsequent cells after elapse of the calculated fluctuation absorbing time after reception of the heading cell.

12. An exchange as set forth in claim 11, wherein the predetermined delay fluctuation absorbing time is an X % delay fluctuation absorbing time which assures a cell reception probability of X %.

13. An exchange as set forth in claim 11 or 12, wherein the cell processing/transmitting means stores the voice data in a fixed-length data packet at a variable encoding rate.

14. An exchange as set forth in claim 13, wherein the detecting means detects the decoding time of the heading cell based on an encoding rate of the heading cell.

15. An exchange as set forth in claim 11 or 12, wherein the cell processing/transmitting means stores the voice data in a variable-length data packet at a fixed encoding rate.

16. An exchange comprising:

cell processing/transmitting means for encoding voice data, converting the encoded data into cells, adding to each of the cells a control header including a sequence data, and transmitting the cells to a network;

cell receiving/processing means having a buffer, for receiving and storing the transmitted cells in the buffer, reproducing the stored cells into coded data according to the sequence data of the cells, and decoding the coded data into the voice data;

heading-cell decoding time detecting means for detecting a decoding time of a heading cell of the transmitted cells;

delay fluctuation absorbing base time calculating means for calculating a delay fluctuation absorbing base time based on a predetermined delay fluctuation absorbing time and the decoding time of the heading cell;

stored-cells decoding time detecting means for detecting the number of cells stored in the buffer for a predetermined time after receiving the heading cell so as to detect decoding time of the stored cells;

correcting means for correcting the delay fluctuation absorbing time based on the decoding time of the cells stored in the buffer; and control means for controlling the cell receiving/processing means to start reproducing of the heading cell and subsequent cells after elapse of the corrected fluctuation absorbing time after receiving the heading cell.

17. An exchange as set forth in claim 16, wherein the delay fluctuation absorbing time is an X % delay fluctuation absorbing time which assures a cell reception probability of X %.

18. An exchange as set forth in claim 16 or 17, wherein the cell processing/transmitting means stores the voice data in a fixed-length data packet at a variable encoding rate.

19. An exchange as set forth in claim 18, wherein the delay fluctuation absorbing base time calculating means calculates the delay fluctuation absorbing base time by using a function having the X % delay fluctuation absorbing time and an encoding rate of the heading cell as variable parameters.

20. An exchange as set forth in claim 16 or 17, wherein the cell processing/transmitting means stores the voice data in a variable-length data packet at a fixed encoding rate.

* * * * *